(12) United States Patent
Judet et al.

(10) Patent No.: US 10,267,154 B2
(45) Date of Patent: Apr. 23, 2019

(54) TURBOMACHINE COMPRISING A SHAFT SLEEVE AND ASSOCIATED SLEEVE TUBE

(71) Applicant: SNECMA, Paris (FR)

(72) Inventors: Maurice Guy Judet, Moissy-Cramayel (FR); Cecile Marie Emilienne Alirot, Moissy-Cramayel (FR); Alexandre Xavier Bossaert, Moissy-Cramayel (FR); Fabrice Marcel Noel Garin, Moissy-Cramayel (FR); Christian Michel Jacques Gosselin, Moissy-Cramayel (FR); Axel Sylvain Loic Thomas, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 413 days.

(21) Appl. No.: 15/038,732

(22) PCT Filed: Nov. 25, 2014

(86) PCT No.: PCT/FR2014/053022
§ 371 (c)(1),
(2) Date: May 23, 2016

(87) PCT Pub. No.: WO2015/075405
PCT Pub. Date: May 28, 2015

(65) Prior Publication Data
US 2016/0362982 A1 Dec. 15, 2016

(30) Foreign Application Priority Data

Nov. 25, 2013 (FR) ...................................... 13 61593

(51) Int. Cl.
*F01D 5/10* (2006.01)
*F01D 5/02* (2006.01)
(Continued)

(52) U.S. Cl.
CPC ................. *F01D 5/10* (2013.01); *F01D 5/02* (2013.01); *F01D 5/026* (2013.01); *F02C 7/36* (2013.01);
(Continued)

(58) Field of Classification Search
CPC ........ F01D 5/10; F04D 29/053; F04D 29/668; F05D 2240/62; F05D 2260/96
See application file for complete search history.

(56) References Cited

U.S. PATENT DOCUMENTS 3,057,542 A * 10/1962 Keenan ................... F01D 11/04
384/317
4,190,398 A * 2/1980 Corsmeier ................ F01D 5/18
415/114
5,232,335 A * 8/1993 Narayana ................ F01D 5/081
415/115
5,555,721 A * 9/1996 Bourneuf .................. F02C 7/18
415/115

(Continued)

FOREIGN PATENT DOCUMENTS

CN 1287696 A 3/2001
EP 0 651 137 A1 5/1995
(Continued)

OTHER PUBLICATIONS

Search Report in French Application No. 1361593 dated Aug. 8, 2014, with English translation coversheet. 3 pages.
(Continued)

*Primary Examiner* — Ninh H. Nguyen
(74) *Attorney, Agent, or Firm* — Womble Bond Dickinson (US) LLP

(57) ABSTRACT

The turbine (1) has a rotor (2) with blades (4) arranged on a periphery of disks (5) in radial planes (3), and a tie rod (6) extending along slots (7) in the disks. An annular spacer (15, 15') fixes a position of the tie rod relative to a center line (M)
(Continued)

of the disks, and is arranged in a channel (10, 11). The spacer has through-openings, which are arranged radially relative to the tie rod or to its center line, and extend coaxial. The channel carries a cooling medium and is limited by a separating pipe (13, 14) radially outwards. The through-openings serve for flow of the medium.

10 Claims, 3 Drawing Sheets

(51) Int. Cl.
  *F02C 7/36* (2006.01)
  *F04D 29/053* (2006.01)
  *F04D 29/32* (2006.01)
  *F04D 29/66* (2006.01)

(52) U.S. Cl.
  CPC ......... *F04D 29/053* (2013.01); *F04D 29/321* (2013.01); *F04D 29/668* (2013.01); *F05D 2220/30* (2013.01); *F05D 2230/60* (2013.01); *F05D 2240/60* (2013.01); *F05D 2250/182* (2013.01); *F05D 2260/30* (2013.01); *F05D 2260/36* (2013.01); *F05D 2300/501* (2013.01); *F05D 2300/611* (2013.01)

(56) References Cited

U.S. PATENT DOCUMENTS

| | | |
|---|---|---|
| 5,586,860 A | 12/1996 | Bertrand et al. |
| 6,338,578 B1 | 1/2002 | Adde et al. |
| 2011/0129336 A1 | 6/2011 | Bonneau et al. |
| 2012/0099988 A1 | 4/2012 | Charier et al. |

FOREIGN PATENT DOCUMENTS

| | | |
|---|---|---|
| EP | 0 987 457 A1 | 3/2000 |
| FR | 2 981 124 A1 | 4/2013 |
| GB | 2 326 679 A | 12/1998 |
| WO | WO 2009/144300 A1 | 12/2009 |
| WO | WO 2010/102995 A1 | 9/2010 |

OTHER PUBLICATIONS

Office Action in Chinese application No. 201480064235.5 dated Dec. 2, 2016. 3 pages.
International Search Report in PCT/FR2014/053022 dated Mar. 17, 2015.

\* cited by examiner

TURBOMACHINE COMPRISING A SHAFT SLEEVE AND ASSOCIATED SLEEVE TUBE

GENERAL TECHNICAL FIELD

The present invention concerns the field of turbine engines. More particularly, the present invention relates to a turbine engine comprising a sleeve extending around a shaft.

PRIOR ART

A turbine engine 1 according to the prior art is shown in FIG. 1. The turbine engine 1 includes a low-pressure shaft 2 extending along an axis 3 of the turbine engine defining an axis of rotation of the low-pressure shaft 2. The low-pressure shaft 2 is connected upstream with respect to the flow direction of the stream of air in the turbine engine 1 to a low-pressure compressor (not shown), and downstream to a low-pressure turbine (not shown) which drives it in rotation.

The turbine engine 1 also includes, upstream, a high-pressure compressor 4 positioned coaxially around the low-pressure shaft 2. The high-pressure compressor 4 is an axial-centrifugal compressor.

The high-pressure compressor 4 includes a rotor 5 and a stator 6 forming a path through which the air flows. The rotor 5 and the stator 6 each have an axial portion, respectively 7 and 8, and a flared portion, respectively 9 and 10. The flared portion 9 of the rotor 5 is the impeller. The impeller 9 comprises a disk 11 rotatably movable about the axis 3 of the turbine engine.

Stationary vanes 12 and rotating blades 13 are positioned in the air flow path. The stationary vanes 12 are connected to the stator 6. The rotating blades 13 are each connected to a disk 14. The disks 14 are connected to the rotor 5 and are rotatably movable about the axis 3 of the turbine engine.

The turbine engine 1 also includes, downstream, a high-pressure turbine 15 positioned coaxially around the low-pressure shaft 2. The high-pressure turbine 15 includes at least one stage equipped with a disk 16 rotatably movable about the axis 3. The disk 16 of the high-pressure turbine 15 is connected to the disk 11 of the impeller 9 and therefore to the rotor 5.

The circuit between the low pressure shaft 2 and the rotor 5, also called the inter-shaft circuit, is subjected to very elevated temperature constraints due to the flow of air through the high-pressure compressor 4 and the high-pressure turbine 15.

It is conventional, for lowering the inter-shaft temperature, to install a cooling circuit 17 passing through it, so that the cool air taken from outside the turbine engine 1 flows through the inter-shaft circuit and increases the temperature gradient between the rotor 5 and the low pressure shaft 2.

The transmission shafts of the turbine engine 1, particularly the low pressure shaft 2, are supported and guided by bearings, accommodated in bearing enclosures, where they are supplied with lubricating oil.

It is conventional, to provide for sealing of the bearing enclosures and avoid having lubricating oil spreading into the inter-shaft circuit, to control the pressure in the bearing enclosures by means of a pressurization circuit 18 connected to the inter-shaft circuit.

Usually, the turbine engine 1 further includes a tubular sleeve 19 extending along the low pressure shaft 2 along the axis 3 of the turbine engine. The sleeve 19 is connected, upstream, to the high-pressure compressor 4 by means of a trunnion 20, and downstream, to the high-pressure turbine 15 by means of a trunnion 21.

The sleeve 19 separates the cooling circuit 17 passing through the inter-shaft circuit and the pressurization circuit 18 for the bearing enclosures. Thus, the air passes through the cooling circuit 17 between the sleeve 19 and the rotor 5 and through the pressurization circuit 18 between the sleeve 19 and the low pressure shaft 2 at distinct pressure levels. The sleeve 19 thus makes it possible to preserve the thermal condition of the low pressure shaft 2 on the one hand, and to ensure adequate pressurization of the bearing enclosures, on the other hand.

In operation, the sleeve 19 is in rotation about the axis 3 of the low pressure shaft 2 and rotates in the opposite direction of the latter.

At certain rotation speeds, the sleeve 19 enters into resonance and vibrates.

These vibrations constitute a considerable risk of damage to the turbine engine 1, when they occur within the operating range of the latter.

This is in particular the case of small turbine engines 1 wherein the diameter of the sleeve 19 is small compared to its length and for which the entry into resonance of the sleeve 19 occurs within the operating range of the turbine engine 1.

PRESENTATION OF THE INVENTION

The present invention has the purpose of compensating for the problems describe above.

To this end, the present invention has as its object a turbine engine comprising a compressor stage and a turbine stage, each stage comprising at least one disk rotatably movable about an axis of the turbine engine, and a tubular shaft sleeve extending along the axis of the turbine engine, including at least one tab extending from an outer radial surface of the sleeve and facing the disk of the compressor stage or the turbine stage, the tab being configured to come into contact with the disk when the sleeve is in rotation about the axis of the turbine engine.

Such a turbine engine has the advantage of having limited risk of damage due to vibrations of the sleeve.

Preferably, the tab comprises a base extending substantially radially from the outer radial surface of the sleeve and a contact portion extending from the base toward a free end of the tab, the contact portion being configured to deform elastically and come into contact with the disk when the sleeve is in rotation about the axis of the turbine engine.

More preferably, the contact portion is locally thinned in an area adjoining the base, wherein the contact portion comprises an outer surface extending facing the disk and forming, at the free end of the tab, a first contact area designed to come into contact with the disk over a first range of rotation speeds of the sleeve, and wherein the outer surface of the contact portion comprises a first surface portion defined by the first contact area, and a second surface portion, extending in the prolongation of the first surface portion and being radially offset toward the disk so as to define a peak, said peak forming a second contact area designed to come into contact with the disk over a second range of rotation speeds of the sleeve.

According to one embodiment of the invention, the outer surface of the tab comprises a protective coating so as to limit wear on the tab.

According to one embodiment of the invention, the tab comprises a base extending substantially radially from the outer radial surface of the sleeve, the base being configured to come into contact with the disk when the sleeve is in rotation about the axis and deforms radially with respect to said axis.

According to one embodiment of the invention, the contact portion extends substantially tangentially with respect to the sleeve. According to one variant, the contact portion extends parallel to the axis of the turbine engine.

According to one embodiment of the invention, the sleeve includes a first tube of which one end cooperates with one end of a second tube, the tab extending to the end of the first tube, from an outer radial surface of said first tube.

According to one embodiment of the invention, the disk includes a step, the tab of the sleeve being configured to come into contact with the step, when the sleeve is in rotation about the axis.

The embodiments of the invention previously described can be combined advantageously.

The invention also has as its object a shaft sleeve extending along an axis, the sleeve being characterized in that it includes at least one tab extending from an outer radial surface of the tube, and in that the tab is configured to come into contact with a disk of a compressor or turbine stage of a turbine engine as previously described, when the sleeve is in rotation about the axis.

PRESENTATION OF THE FIGURES

Other features, aims and advantages of the invention will be revealed by the description that follows, which is purely illustrative and not limiting, and which must be read with reference to the appended drawings, wherein.

DETAILED DESCRIPTION

Figure 1:
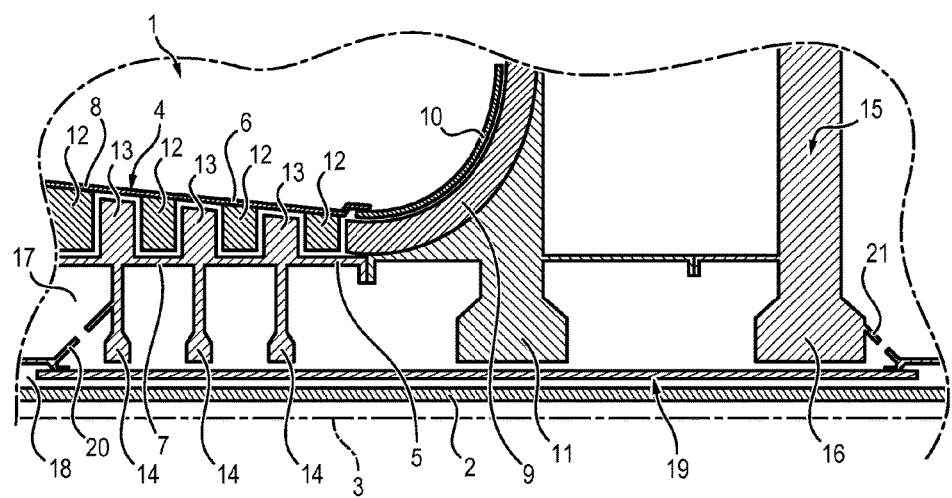
FIG. 1 (already described) shows schematically, in longitudinal section, the partial view of a turbine engine comprising a prior art sleeve.
Figure 2:
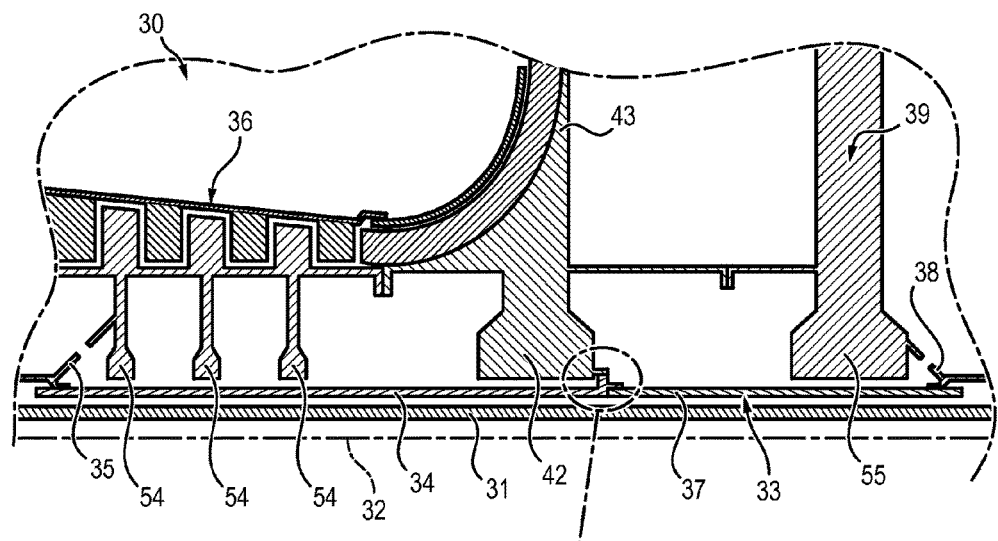
FIG. 2 shows schematically, in longitudinal section, a partial view of a turbine engine comprising a sleeve according to an embodiment of the invention.

FIG. 2 shows a partial view, in longitudinal section, of a turbine engine 30 comprising a low-pressure shaft 31 extending along an axis 32 of the turbine engine defining an axis of rotation of the low-pressure shaft 31.

The turbine engine 30 also includes a sleeve 33 extending around the low-pressure shaft 31 along the axis 32 of the turbine engine.

The sleeve 33 is in two parts. The sleeve 33 includes a first tube 34 a first end whereof is connected to a trunnion 35 of a high pressure compressor 36. The sleeve 33 also includes a second tube 37 of which a first end is connected to a trunnion 38 of a high-pressure turbine 39 and of which a second end is threaded and cooperates with a complementary thread provided inside a second end of the first tube 34.

The sleeve 33 includes at least one tab 40 extending from an outer radial surface 41 of the first tube 34. In the example shown in FIG. 2, the tab 40 is positioned at the second end of the first tube 34.

Figure 2A:
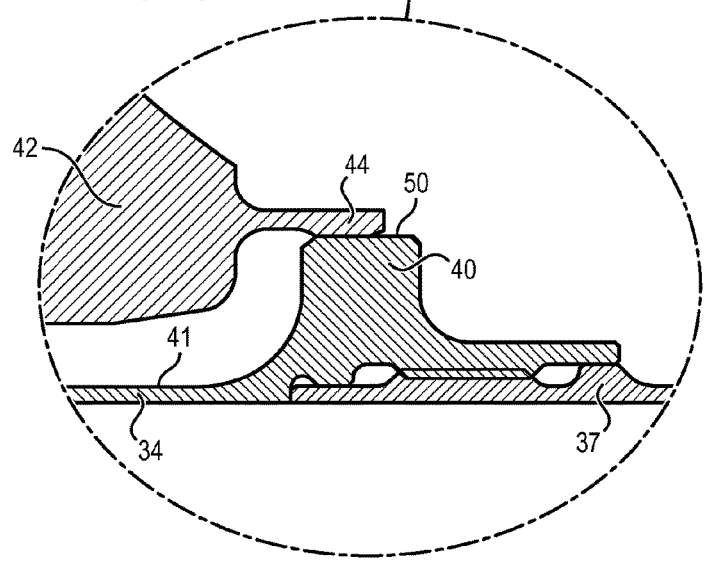
FIG. 2a shows a detail view of the sleeve shown in FIG. 2.

The tab 40 extends facing a disk 42 connected to an impeller 43 of the high-pressure compressor 36. The disk 42 of the impeller 43 includes an annular step 44 extending parallel to the axis 32 of the turbine engine from the disk 42 of the impeller 43. The annular step 44 includes an inner surface with the tab 40 extending facing it. The tab 40 and the step 44 are particularly visible in FIG. 2a.

Figure 3:
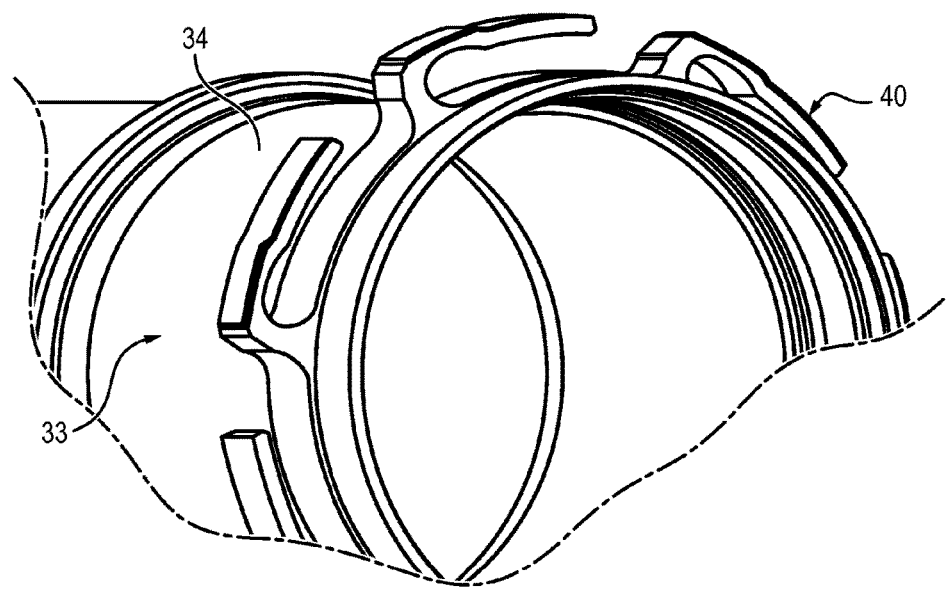
FIG. 3 shows a perspective view of the sleeve shown in FIG. 2.

FIG. 3 shows a perspective view of the first tube 34 of the sleeve 33. The sleeve 33 includes several tabs 40 positioned over the entire circumference of the first tube 34. Preferably, the distance between two adjoining tabs 40 is constant.

Figure 4:
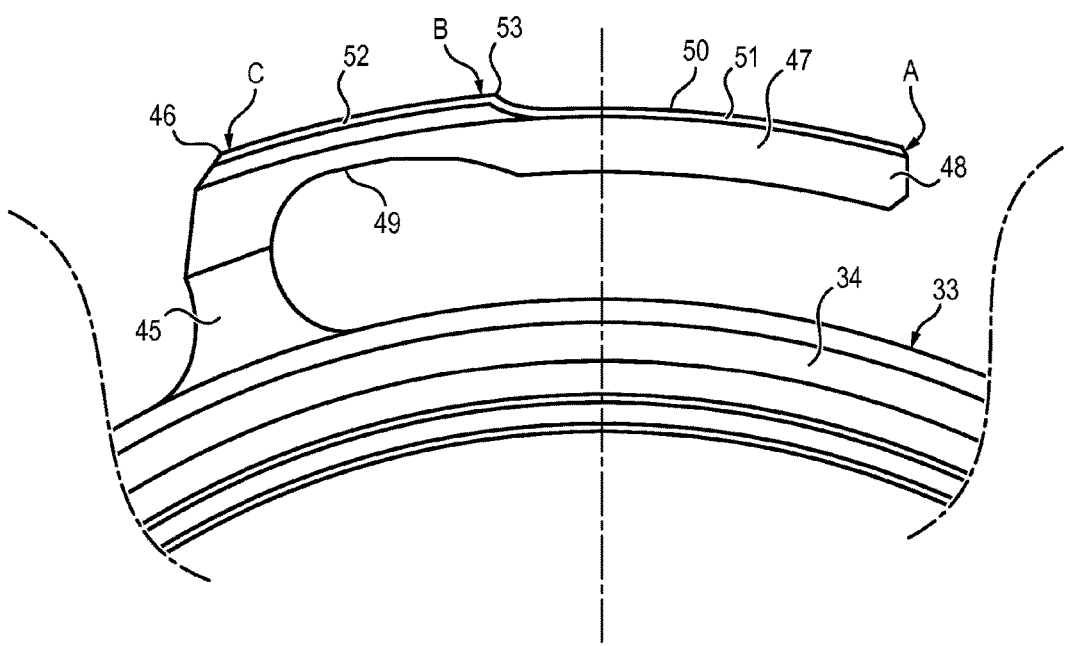
FIG. 4 shows a detail view of a tab of the sleeve shown in FIG. 2.

FIG. 4 shows a detail view, in transverse section, of the sleeve 33, where a tab 40 appears.

The tab 40 has an L shape in general. The tab 40 includes a base 45 which extends substantially radially with respect to the axis 32 of the turbine engine, from the outer radial surface 41 to a peak 46. The tab 40 also includes a contact portion 47 extending from the base 45 to a free end 48 of the tab 40.

In the example shown in FIG. 4, the contact portion 47 extends substantially parallel to the circumference of the first tube 34. According to a variant, not shown, the contact portion 47 can extend substantially parallel to the axis 32 of the turbine engine.

The contact portion 47 is locally thinned in an area adjacent to the base 45. The contact portion 47 comprises an inner face 49 facing the outside radial surface 41 of the first tube 34 having, between the contact portion 47 and the base 45, a concave shape, making it possible to increase the deformability of the contact portion 47.

The contact portion 47 also comprises an outer surface 50 extending facing the disk 42 of the impeller 43. More precisely, the outer surface 50 extends facing the inner face of the annular step 44 of the disk 42 of the impeller 43. The outer surface 50 of the contact portion 47 forms, at the free end 48 of the tab 40, a first surface portion 51.

The outer surface 50 of the contact portion 47 comprises a second surface portion 52, extending in the prolongation of the first surface portion 51. The second surface portion 51 is radially offset toward the disk 42 of the impeller 43 so as to define a peak 53.

The first surface portion 51 defines a first contact area A. The first contact area A is designed to come into contact with the disk 42 of the impeller 43 over a first range of rotation speeds of the sleeve 33. More precisely, the first contact area A is designed to come into contact with the inner face of the annular step 44 of the disk 42 of the impeller 43. The first contact area A of the contact portion 47 remains continuously in contact with the disk 42 of the impeller 43 over the first range of rotation speeds of the sleeve 33. The first range of rotation speeds of the sleeve 33 preferably covers low rotation speeds, near stopping, of the sleeve 33. The first range of rotation speeds of the sleeve 33 comprises for example rotation speeds between 8,000 and 12,000 rpm.

The peak 53 of the outer surface 50 forms a second contact area B designed to come into contact with the disk 42 of the impeller 43 over a second range of rotation speeds of the sleeve 33. More precisely, the second contact area B is designed to come into contact with the inner face of the annular step 44 of the disk 42 of the impeller 43. The second contact area B of the contact portion 47 remains continuously in contact with the disk 42 of the impeller 43 over the second range of rotation speeds of the sleeve 33. The second range of rotation speeds of the sleeve 33 preferably comprises the highest rotation speeds of the first range of rotations speeds of the sleeve 33. Thus, in the second range of rotation speeds of the sleeve 33, the tab 40 is in contact with the disk 42 of the impeller 43 both at the first contact area A and at the second contact area B. The second range of rotation speeds of the sleeve 33 includes for example rotation speeds between 12,000 and 25,000 rpm.

The base 45 comprises a third contact area C positioned at the peak 46 of the base 45, and designed to come into contact with the disk 42 of the impeller 43 when the sleeve 33 is in rotation about the axis 32 of the turbine engine and is deforming radially with respect to said axis. Such a radial deformation of the sleeve 33 occurs when the sleeve 33 reaches a critical rotation speed and begins to vibrate or, in the case of a strong imbalance, resonance or rupture of a tab 40. More precisely, the third contact area C is designed to come into contact with the inner face of the annular step 44 of the disk 42 of the impeller 43.

As long as the sleeve 33 is given a rotary movement about the axis 32 of the turbine engine, the contact portion 47 is deformed elastically, the free end 48 of the tab 40 rises in the direct of the disk 42 of the impeller 43 under the influence of the rotation of the sleeve 33 and the first contact area A of the contact portion 47 comes into contact with the disk 42 of the impeller 43. The contact between the first contact area A and the disk 42 of the impeller 43 has the effect of increasing a value of the critical rotation speeds of the sleeve 33. The critical rotation speeds of the sleeve 33 correspond to rotation speeds at which the sleeve 33 enters into resonance and begins to vibrate.

When the rotation speed of the sleeve 33 increases and enters the second range of rotation speeds of the sleeve 33, the contact portion 47 deforms further until contact area B also comes into contact with the disk 42 of impeller 43. Adding the contact between the second contact area B and the disk 42 of the impeller 43 has the effect of further increasing a value of the critical rotation speeds of the sleeve 33.

Finally, if the contacts between the first and second contact areas A and B of the tab 40 and the disk 42 of the impeller 43 are not sufficient to increase the value of the critical rotation speeds of the sleeve 33 so that they are displaced outside an operating range of the turbine engine 30, and the sleeve 33 enters into resonance and begins to vibrate, the tab 40 driven by the radial deformations of the sleeve 33, moves toward the disk 42 of the impeller 43 and the third contact area C of the base 45 comes into contact with the disk 42 of the impeller 43. The contact between the third contact area C and the disk 42 of the impeller 43 has the effect of limiting the radial deformations of the sleeve 33 and therefore of inhibiting vibrations.

Moreover, if the contact portion 47 breaks and the sleeve 33 enters into resonance and begins to vibrate, the radial deformations of the sleeve 33 with respect to the axis 32 of the turbine engine are also limited by the base 45 of the tab 40.

Thus the tab 40 is configured to come into contact with the disk 42 of the impeller 43, when the sleeve 33 is in rotation about the axis 32 of the turbine engine. More precisely, the tab 40 is configured to only come into contact with the disk 42 of the impeller 43 when the sleeve 33 is in rotation about the axis 32 of the turbine engine. In other words, the tab 40 is not in contact with the disk 42 of the impeller 43 when the sleeve 33 is stopped and the tab 40 is in contact with the disk 42 of the impeller 43 when the sleeve 33 has a rotary movement about the axis 32 of the turbine engine.

In the example presented in FIG. 4, the outer surface 50 of the contact portion 47 comprises a protective coating designed to protect the tab 40 from friction occurring during contact between the first, second and third contact areas A, B and C and the disk 42 of the impeller 43.

As a variant, the tab 40 is positioned facing one of the disks 54 of the high-pressure compressor 36 or of the disk 55 of the high-pressure turbine 39, and is configured to come into contact with the disk 54 or 55 which it faces. The disk 54 or 55 with which the tab 40 comes into contact can also include an auxiliary step similar to the annular step 44 of the disk 42 of the impeller 43.

The invention claimed is:

1. A turbine engine comprising
   compressor stage and a turbine stage, each stage comprising at least one disk rotatably movable about an axis of the turbine engine, and
   a tubular shaft sleeve extending around the shaft along the axis of the turbine engine, wherein the sleeve includes at least one tab extending from an outer radial surface of the sleeve and facing the disk of the compressor stage or the turbine stage, the tab (40) being configured to come into contact with the disk when only the sleeve is in rotation about the axis of the turbine engine.

2. The turbine engine according to claim 1, wherein the tab comprises a base extending substantially radially from the outer radial surface of the sleeve and a contact portion extending from the base toward a free end of the tab, the contact portion being configured to deform elastically and come into contact with the disk when the sleeve is in rotation about the axis of the turbine engine.

3. The turbine engine according to claim 2, wherein the contact portion is locally thinned in an area adjoining the base, wherein the contact portion comprises an outer surface extending facing the disk and forming, at the free end of the tab, a first contact area (A) designed to come into contact with the disk over a first range of rotation speeds of the sleeve, and wherein the outer surface of the contact portion comprises a first surface portion defined by the first contact area (A), and a second surface portion extending in the prolongation of the first surface portion and being radially offset toward the disk so as to define a peak, the peak forming a second contact area (B) designed to come into contact with the disk over a second range of rotation speeds of the sleeve.

4. The turbine engine according to claim 3, wherein the outer surface of the tab comprises a protective coating.

5. The turbine engine according to claim 2, wherein the contact portion extends substantially tangentially with respect to the sleeve.

6. The turbine engine according to claim 2, wherein the contact portion extends parallel to the axis of the turbine engine.

7. The turbine engine according to claim 1, wherein the tab comprises a base extending substantially radially from the outer radial surface of the sleeve, the base being configured to come into contact with the disk when the sleeve is in rotation about the axis and deforms radially with respect to the axis.

8. The turbine engine according to claim 1, wherein the sleeve includes a first tube of which one end cooperates with one end of a second tube, the tab extending to the end of the first tube from an outer radial surface of the first tube.

9. The turbine engine according to claim 1, wherein the disk includes a step, the tab of the sleeve being configured to come into contact with the step, when the sleeve is in rotation about the axis.

10. A tube of the shaft sleeve of a turbine engine extending along an axis, wherein the sleeve includes at least one tab extending from an outer radial surface of the tube, and in that the tab is configured to come into contact with a disk of a compressor or turbine stage of a turbine engine, when only the sleeve is in rotation about the axis.

* * * * *